July 6, 1937. E. C. BREKELBAUM 2,086,208
HELMET FOR ELECTRIC ARC WELDERS
Filed March 28, 1935
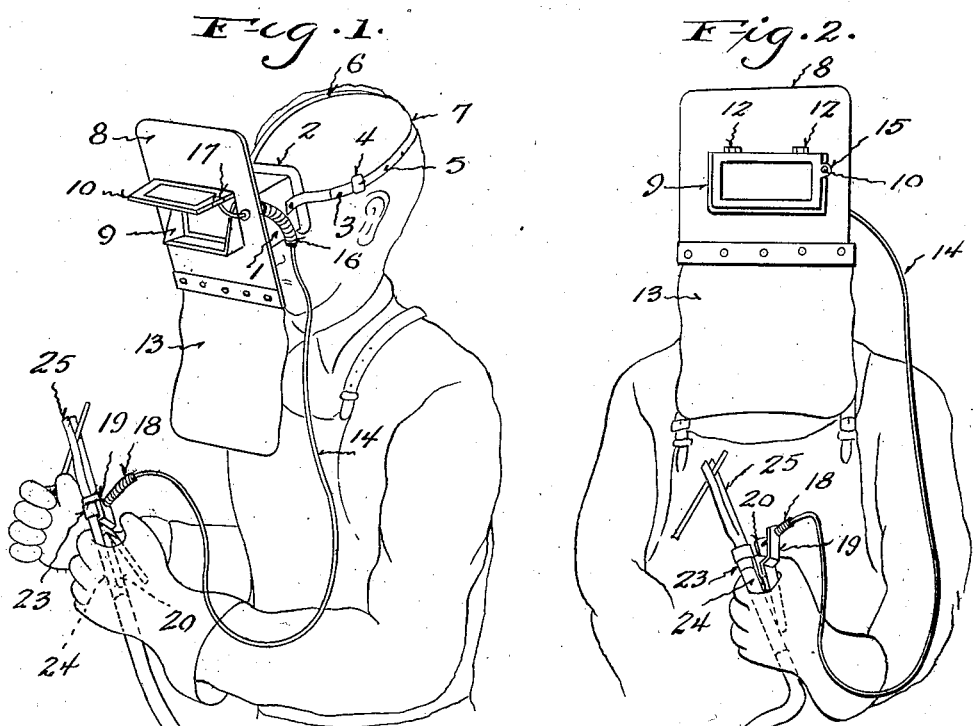
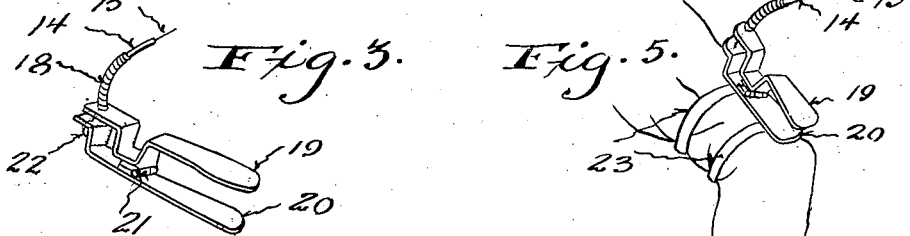
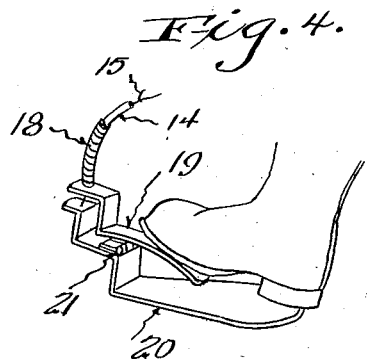
Inventor
E. C. Breckelbaum
By
Attorneys Patented July 6, 1937

2,086,208

UNITED STATES PATENT OFFICE 2,086,208

HELMET FOR ELECTRIC-ARC WELDERS

Erwin Carl Brekelbaum, Hamburg, Germany

Application March 28, 1935, Serial No. 13,459
In Germany May 17, 1934

1 Claim. (Cl. 2—8)

The invention relates to a new and useful helmet for the electric arc welder, and the object of the invention is to give the welder's eyes and face a perfect protection from the direct light and injurious rays emanating from the arc.

A further object of the invention resides in the pivoted mounting of the welder's protective glass window, which allows the welder to maintain the helmet continually on his head because he only needs to open and close this pivoted protective glass window.

A further object of the invention resides therein that the pivotally mounted protective glass window is manipulated through a "Bowden-strip", which enables the welder to manipulate the window at every suitable distance and position from the helmet itself.

A further object of the invention resides therein that the "Bowden-strip" manipulating lever is so constructed that it can be manipulated with every suitable, and for the particular case practicable, part of the welder's body.

A further object of the invention is the particular arrangement of the head support bands, which enable the welder to put on the helmet with one hand, just as if he puts on his hat.

A further object is the particular frame construction around the front of the shield opening, which enables a perfect light obstruction even when the pivoted window is not absolutely tightly closed.

Other objects of the invention reside therein that the whole helmet is suitably made out of aluminum, which makes the helmet very light and therefore comfortable to carry on the head. The part of the helmet which makes direct contact with the head is padded with very soft and flexible rubber, which makes the helmet lie very soft and comfortably on the head, and, at the same time, gives an insulating section between the helmet and the head.

The particular object of the invention, therefore, is to provide an improved arc welder's helmet with mechanical operation of the protective glass window.

Other objects of the invention will appear from the following description and accompanying drawing and will be pointed out in the annexed claim.

In the accompanying drawing, there has been disclosed a structure designed to carry out the various objects of the invention, but it is to be understood that the invention is not confined to the exact features shown as various changes may be made within the scope of the claim which follows.

In the accompanying drawing forming part of the specifications;

Figure 1 is a side view of the welder with the helmet on his head. The pivoted protective glass window is open and the "Bowden-strip" manipulating lever is also open.

Figure 2 is a front view of the welder with the helmet on his head. The pivoted window is closed and the manipulating lever is also closed.

Figure 3 shows a detail view of the "Bowden-strip" manipulating lever connected with the "Bowden-strip".

Figure 4 shows a detail view of the "Bowden-strip" manipulating lever for foot manipulation.

Figure 5 shows a detail view of the manipulating lever for manipulation with the legs.

All parts of the helmet with its auxiliaries are clearly shown in Figures 1–5. There is illustrated the helmet eye case 1, Figure 1, which is a suitable rectangular case with both ends open and one edge cut out to fit the nose and face contours. This edge of the eye case 1, which makes direct contact with the face, has a very soft and flexible rubber lining 2. The head support bands, shown in Figure 1, consist of two flexible steel side bands 3, pivotally fastened to the sides of the eye case 1, and the head band 6 connected to the top of the eye case 1. Connected to these two steel side bands 3, with buckles 4, are the two rubber side bands 5. The head band 6, also made of flexible steel, is united with the side bands 3—5 in a common ring 7.

The shield 8, shown in Figures 1 and 2, is suitably connected to the eye case 1. This shield 8 has a cut out section which matches with the opening in the eye case 1, as can be clearly seen in Figure 1. A frame 9, Figures 1 and 2, is suitably fastened around the bottom and sides of this opening. The welder's protective glass and the clear cover glass are pushed in through the side opening in the pivotally mounted window 10 and are held there through a leaf spring. The window 10, when closed, covers the opening in the shield 8 and eye case 1, and fits into the frame 9, as can be clearly seen in Figure 2. The pivoted window 10 is held open through two springs 12, Figure 2, which are suitably mounted in the hinge of window 10. The pivoted window 10 is closed through the "Bowden-strip" which will be described later. A leather protection 13, for the lower part of the face, throat, and chest, is suitably fastened to the lower part of the shield 8, see Figures 1 and 2.

The hull 14 of the "Bowden-strip" is suitably fastened with a protective spring 16 to the side of the eye case 1, clearly shown in Figure 1. The inside wire 15 of the "Bowden-strip", Figure 3, is directly connected to the pivoted window 10, with a suitable ball joint 17. The other end of the "Bowden-strip" hull 14 is suitably fastened with the protective spring 18 to the manipulating lever arm 19.

The manipulating lever, Figure 3, consists of two suitable lever arms 19 and 20 which are connected with a hinge 21. The "Bowden-strip" inside wire 15 is fastened with a suitable ball joint 22 to the manipulating lever arm 20, as clearly shown in Figure 3.

A modified form of the manipulating lever of Figure 3 is illustrated in Figures 1 and 2; wherein the lever arm 20 has a suitably attached clasp 23, made out of steel band, which is put over the handle 24 of the electrode holder 25; so that the manipulating lever can be operated with the same hand that leads the electrode.

Figure 4 illustrates another modified form wherein the manipulating lever is suitably built up to be manipulated with the foot of the welder.

Figure 5 illustrates another modified form wherein the manipulating lever is built up to be manipulated with the legs.

Another modified form, to suit the likes of the arc welder, is the reverse arrangement in which the protective glass window 10 is closed through the springs 12 and is opened through the "Bowden-strip" manipulating lever.

I claim as my invention:

In a protector for arc welders, a shield having a window opening, a pivoted glass window for said opening normally held in a raised position, a "Bowden-strip" operatively connected to the window, means for manipulating the "Bowden-strip" including a stationary base, an operating lever pivotally mounted on said base having a hand grip, and means for detachably connecting the base to a weld rod, whereby upon the grasping of the rod the hand grip will be actuated.

ERWIN CARL BREKELBAUM.